United States Patent [19]

Bandy et al.

[11] Patent Number: 6,002,344

[45] Date of Patent: Dec. 14, 1999

[54] SYSTEM AND METHOD FOR ELECTRONIC INVENTORY

[76] Inventors: William R. Bandy, 2406 Bell Branch Rd., Gambrills, Md. 21054; Michael R. Arneson, 1500 Conrose Dr., Westminster, Md. 21157; Robert A. Williams, 2732 McKinley St., N.W. Washington, D.C. 20015

[21] Appl. No.: 08/975,969

[22] Filed: Nov. 21, 1997

[51] Int. Cl.⁶ .............................. G07G 1/12; G06F 7/04; G06F 17/60; G06K 15/00

[52] U.S. Cl. ...................... 340/825.54; 705/22; 705/23; 705/28

[58] Field of Search ................. 705/22, 23, 28; 340/825.54

[56] References Cited

U.S. PATENT DOCUMENTS

| | | | |
|---|---|---|---|
| 3,520,406 | 7/1970 | Turner | 209/111.5 |
| 3,689,885 | 9/1972 | Kaplan et al. | 340/152 T |
| 4,225,953 | 9/1980 | Simon et al. | 367/117 |
| 4,418,411 | 11/1983 | Strietzel | 371/67 |
| 4,471,345 | 9/1984 | Barrett, Jr. | 340/572 |
| 4,495,496 | 1/1985 | Miller, III | 340/825.54 |
| 4,533,871 | 8/1985 | Boetzkes | 324/207 |
| 4,598,275 | 7/1986 | Ross et al. | 340/573 |
| 4,636,950 | 1/1987 | Caswell et al. | 364/403 |
| 4,656,463 | 4/1987 | Anders et al. | 340/572 |
| 4,862,160 | 8/1989 | Ekchian et al. | 340/825.54 |
| 4,931,788 | 6/1990 | Creswick | 340/825.54 |
| 5,124,699 | 6/1992 | Tervoert et al. | 340/825.54 |
| 5,214,409 | 5/1993 | Beigel | 340/572 |
| 5,245,534 | 9/1993 | Waterhouse et al. | 705/28 |
| 5,266,925 | 11/1993 | Vercellotti et al. | 340/572 |
| 5,289,372 | 2/1994 | Guthrie et al. | 705/28 |
| 5,313,052 | 5/1994 | Watanabe et al. | 235/375 |
| 5,365,551 | 11/1994 | Snodgrass et al. | 375/1 |
| 5,390,360 | 2/1995 | Scop et al. | 455/34.2 |
| 5,410,315 | 4/1995 | Huber | 342/42 |
| 5,420,577 | 5/1995 | Kim et al. | 340/825.52 |
| 5,430,441 | 7/1995 | Bickley et al. | 340/825.54 |
| 5,434,572 | 7/1995 | Smith | 342/44 |
| 5,434,775 | 7/1995 | Sims et al. | 705/8 |
| 5,444,223 | 8/1995 | Blama | 235/435 |
| 5,446,447 | 8/1995 | Carney et al. | 340/572 |
| 5,478,991 | 12/1995 | Watanabe et al. | 235/375 |
| 5,489,908 | 2/1996 | Orthmann et al. | 342/42 |
| 5,499,017 | 3/1996 | Beigel | 340/572 |

(List continued on next page.)

FOREIGN PATENT DOCUMENTS

| | | | |
|---|---|---|---|
| 0 494 114 A2 | 7/1992 | European Pat. Off. | G07C 9/00 |
| 0 585 132 A1 | 3/1994 | European Pat. Off. | G01S 13/78 |
| 0 598 624 A1 | 5/1994 | European Pat. Off. | G01S 13/24 |
| 0 615 285 A2 | 9/1994 | European Pat. Off. | H01L 21/60 |
| WO93/05485 | 3/1993 | WIPO | G07G 1/12 |

*Primary Examiner*—Eric W. Stamber
*Assistant Examiner*—James W. Myhre
*Attorney, Agent, or Firm*—Sterne, Kessler, Goldstein & Fox P.L.L.C

[57] ABSTRACT

A system and method for conducting an inventory of tags, wherein each tag is assigned a Tag ID and a manufacturer number. Each tag can be attached to an item to take inventory of those items. A tag reader transmits a wake-up signal followed by at least one clock signal. Each tag increments a first tag count in response to the clock signals, and transmits the Tag ID assigned to the tag when the first tag count corresponds to the Tag ID assigned to the tag. The tag reader records the transmitted Tag IDs. When more than one tag transmits simultaneously, the tag stores the Tag ID in order to resolve the contention when the first read cycle is complete. In the second read cycle, the tag reader transmits the contended Tag ID followed by at least one clock signal. Each tag that contended for the transmitted Tag ID increments a second tag count in response to the clock signals, and transmits the manufacturer number assigned to the tag when the second tag count corresponds to the manufacturer number assigned to the tag. The tag reader records the transmitted Tag IDs, completing the inventory of the tags.

67 Claims, 10 Drawing Sheets

U.S. PATENT DOCUMENTS

| | | | |
|---|---|---|---|
| 5,500,650 | 3/1996 | Snodgrass et al. | 342/42 |
| 5,519,381 | 5/1996 | Marsh et al. | 340/572 |
| 5,528,222 | 6/1996 | Moskowitz et al. | 340/572 |
| 5,528,232 | 6/1996 | Verma et al. | 340/825.54 |
| 5,537,105 | 7/1996 | Marsh et al. | 340/825.54 |
| 5,539,394 | 7/1996 | Cato et al. | 340/825.54 |
| 5,541,928 | 7/1996 | Kobayashi et al. | 370/95.1 |
| 5,550,547 | 8/1996 | Chan et al. | 342/42 |
| 5,557,280 | 9/1996 | Marsh et al. | 342/44 |
| 5,566,441 | 10/1996 | Marsh et al. | 29/600 |
| 5,576,692 | 11/1996 | Tompkins et al. | 340/571 |
| 5,583,850 | 12/1996 | Snodgrass et al. | 370/342 |
| 5,591,951 | 1/1997 | Doty | 235/435 |
| 5,627,517 | 5/1997 | Theimer et al. | 340/572 |
| 5,627,544 | 5/1997 | Snodgrass et al. | 342/42 |
| 5,640,151 | 6/1997 | Reis et al. | 340/825.54 |
| 5,646,607 | 7/1997 | Shürmann et al. | 340/825.54 |
| 5,648,765 | 7/1997 | Cresap et al. | 340/825.35 |
| 5,648,767 | 7/1997 | O'Connor et al. | 340/928 |
| 5,673,037 | 9/1997 | Cesar et al. | 340/825.54 |
| 5,680,459 | 10/1997 | Hook et al. | 380/23 |
| 5,686,888 | 11/1997 | Welles, II et al. | 340/539 |
| 5,686,902 | 11/1997 | Reis et al. | 340/825.54 |
| 5,689,239 | 11/1997 | Turner et al. | 340/572 |
| 5,774,876 | 6/1998 | Woolley et al. | 705/28 |
| 5,798,693 | 8/1998 | Engellenner | 340/505 |

SYSTEM AND METHOD FOR ELECTRONIC INVENTORY

BACKGROUND OF THE INVENTION

1. Field of the Invention

The present invention relates generally to electronic inventory systems, and more particularly to the use of radio frequency identification (RFID) tags using anti-clash protocols.

2. Description of the Related Art

In modern business, maintaining an accurate inventory of merchandise is crucial. In the past, taking an inventory was an entirely manual process, and therefore slow and expensive. Modern automated inventory systems have improved the accuracy and speed of this process while reducing its cost. With the development of modem manufacturing methods, such as Just-In-Time Delivery, even faster and more accurate inventory methods are required. In some businesses, such as the baggage-handling aspect of the airline industry, inventories must be taken almost instantaneously.

Especially in the airline baggage handling industry, the need for quick and accurate inventories of bags cannot be exaggerated. In the past, the failure to match bags to passengers was merely an inconvenience. However, in the modern age of airline terrorism, the need to match passengers to bags has become a crucial safety concern. Following several airline bombings, the Commission on Aviation Safety and Security issued several recommendations to President Clinton on Sep. 5, 1996 to combat such terrorism. One of the recommendations stated: "Match passengers to their bags to ensure that the baggage of anyone who does not board the plane is removed".

One approach to electronic inventory systems is the use of RFID tags. In such systems, an RFID tag is attached to each item to be inventoried. Each tag includes a microprocessor and RF circuitry capable of responding to signals sent from a tag reader. In an ideal inventory system, each tag is assigned a unique tag identification number (Tag ID).

In one such system, the reader transmits a series of clock pulses to the tags. Each clock pulse defines a time slot. Each tag selects a particular time slot using a random number generator and then counts the received time slots. When a given tag's time slot is reached, the tag transmits its Tag ID to the reader. The reader records the received Tag IDs to create an inventory of the tags read.

This approach can suffer from a problem known as "time slot contention". Time slot contention occurs when more than one tag selects the same time slot for Tag ID transmission. When this occurs, the reader is bombarded by more than one tag transmission simultaneously. Because the tag signals interfere with each other, the reader cannot identify the tags.

SUMMARY OF THE INVENTION

The present invention is a system and method for conducting an inventory of tags, wherein each tag is permanently assigned a Tag ID and a manufacturer number; preferably, this assignment takes place at the time of tag manufacture. Each tag can be attached to an item to take inventory of those items. A tag reader transmits a wake-up signal followed by at least one clock signal. Each tag increments a first tag count in response to the clock signals, and transmits the Tag ID assigned to the tag when the first tag count corresponds to the Tag ID assigned to the tag. The tag reader records the transmitted Tag IDs. When more than one tag transmits simultaneously, the tag reader stores the contended Tag ID in order to resolve the contention when the first read cycle is complete. In the second read cycle, the tag reader transmits the contended Tag ID followed by at least one clock signal. Each tag that contended for the transmitted Tag ID increments a second tag count in response to the clock signals, and transmits the manufacturer number assigned to the tag when the second tag count corresponds to the manufacturer number assigned to the tag. The tag reader records the transmitted Tag IDs, completing the inventory of the tags.

BRIEF DESCRIPTION OF THE FIGURES

The present invention will be described with reference to the accompanying drawings.

DETAILED DESCRIPTION OF THE PREFERRED EMBODIMENTS

Introduction

The present invention is a system and method for electronic inventory using radio frequency identification (RFID) tags and anti-clash protocol. The anti-clash protocol solves the above-mentioned problem of time slot contention. The present invention is particularly suited to use in the airline baggage-handling industry. In particular, the present invention is ideally suited for use in taking rapid inventories of passenger bags and then matching passenger bags to passengers.

The present invention involves the use of an RFID tag that is inexpensive, disposable, and ideally suited to mass production. In one embodiment, each tag is produced as a pair of tags. One of the pair is affixed to an airline passenger's ticket; the other is attached to the passenger's bag. The bags, and the passengers themselves, can then be inventoried nearly instantaneously using an unobtrusive, low power radio signal.

Figure 1:
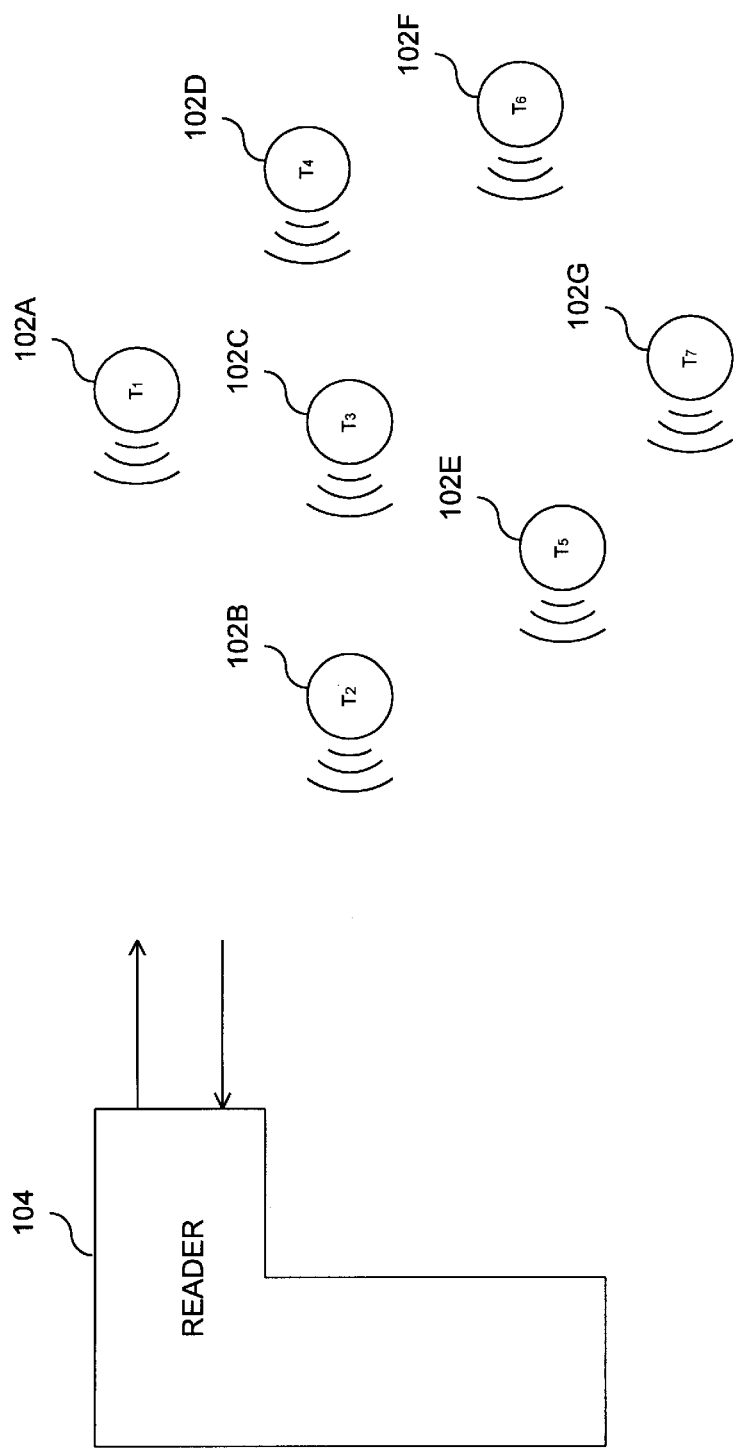
FIG. 1 depicts a tag reader and a plurality of tags according to the present invention for use in an electronic inventory system.

FIG. 1 depicts a tag reader 104 and a plurality of tags 102a–102g for use in an electronic inventory system. In a preferred embodiment of the present invention, each tag is permanently allocated a unique Tag ID. In a preferred embodiment, this assignment takes place at the time of tag manufacture using technologies such as laser-programming or fusible link, which are well-known in the relevant arts. In one embodiment, the Tag ID defines a time slot during which a tag will respond to tag reader 104. The Tag ID can be encrypted for security purposes. In another embodiment, the Tag ID is a separate value. Referring to FIG. 1, tag 102a is assigned to slot $T_1$, tag 102b is assigned time slot $T_2$, and so on.

Each tag is also assigned a manufacturer number, representing the identity of the manufacturer of the tag, and a lot number, representing the manufacturing lot of the tag. In a preferred embodiment, this assignment takes place at the time of tag manufacture. For example, the lot number may specify the date and time of manufacture, the wafer number of the integrated circuit on the tag, etc. In a preferred embodiment, the Tag ID, manufacturer number and lot number are laser-programmed into the tag at the time of tag manufacturer. Therefore, these values are permanently fixed at the time of manufacture and cannot subsequently be changed.

Referring to FIG. 1, in a preferred embodiment of the present invention, tag reader 104 emits a series of clock instructions. Each clock instruction defines a time slot. Tags 102 count the time slots. When the time slot count is equivalent to the Tag ID programmed into a tag, the tag transmits its Tag ID to tag reader 104. In this way, tag reader 104 accumulates the Tag IDs of the inventory tags.

Figure 2:
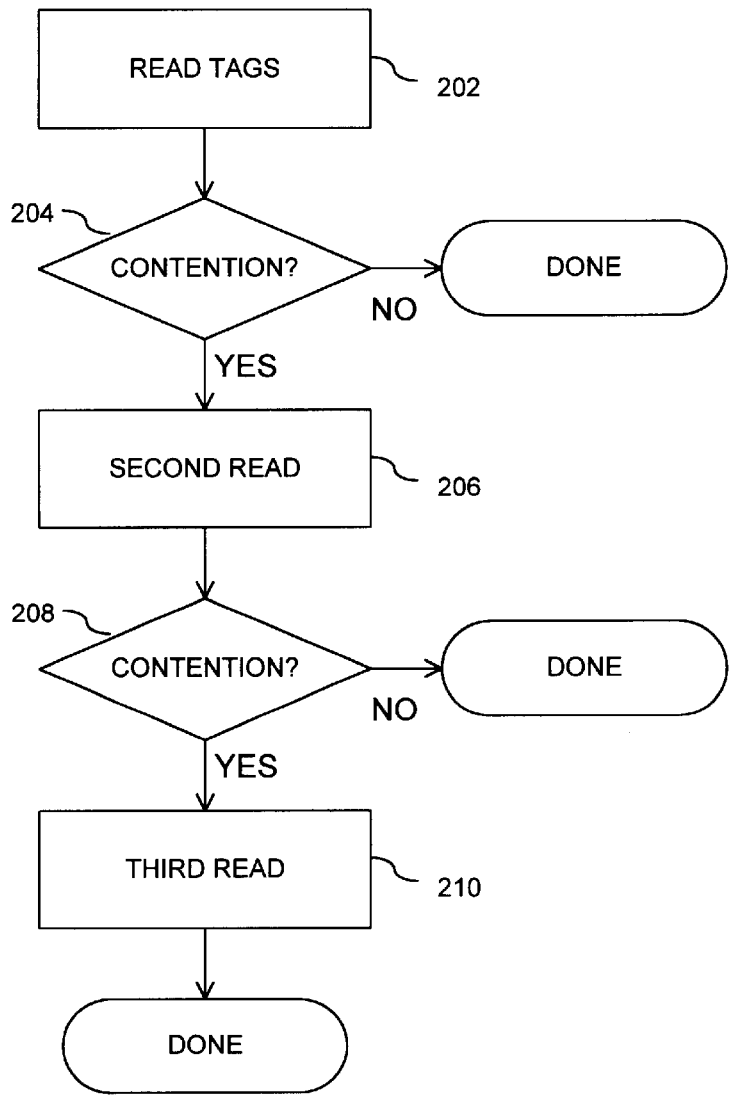
FIG. 2 is a flowchart depicting the operation of the present invention according to a preferred embodiment.

FIG. 2 is a flowchart depicting the operation of the present invention according to a preferred embodiment. The flowchart illustrates the present invention's use of multiple reads and multiple tag identifiers to avoid time slot contention. Referring to FIG. 2, the tags are read for the first time as described above with respect to FIG. 1, and as shown in a step 202. If no time slot contention is detected, as shown by the "no" branch from step 204, then the inventory is complete and accurate.

As described above, time slot contention occurs when multiple tags transmit to the reader in the same time slot. The tag reader can detect this contention in many ways that are well known in the art. For example, each tag could error-code its transmission, for example by using a checksum. When the tag reader receives a tag transmission, it computes a checksum. If two tags transmit simultaneously, the computed checksum will not match the transmitted checksum. When tag reader 104 determines that these checksums do not match, then time slot contention has been detected. Other methods of detecting time slot contention may be employed with the present invention without departing from its spirit and scope.

If during the first tag read contention was detected, as shown by the "yes" branch from step 204, then a second tag read is performed, as shown in a step 206. While the first tag read was based on Tag IDs, the second tag read is based on a separate value that was permanently programmed into the tag at the time of tag manufacture. In a preferred embodiment, that second value is the manufacturer number of the tag.

During the second read, each contended tag ID is resolved separately. For each contended Tag ID, only those tags that contended for that Tag ID are polled. In the second read cycle, tag manufacturer numbers are used to select the time slot during which the tag will transmit. If no contention is detected in the second read, as shown by the "no" branch from step 208, then the Tag IDs of the tags that contended in the first read have been recorded by the tag reader, and the inventory is complete. However, if time slot contention is detected during the second read, as shown by the "yes" branch from step 208, then a third tag read is performed, as shown in a step 210.

In the third read, each contended manufacturer number is resolved separately. For each contended manufacturer number, only those tags that contended for that manufacturer number are polled. In the third read cycle, a third permanent tag identifier is used to break the contention of the second read. These third identifiers are programmed into each tag at the time of manufacture. In a preferred embodiment, this third value is the lot number of the tag. In the unlikely event that the third tag read does not resolve all time slot contentions, further similar read operations may be performed without departing from the spirit and scope of the present invention.

Figure 3:
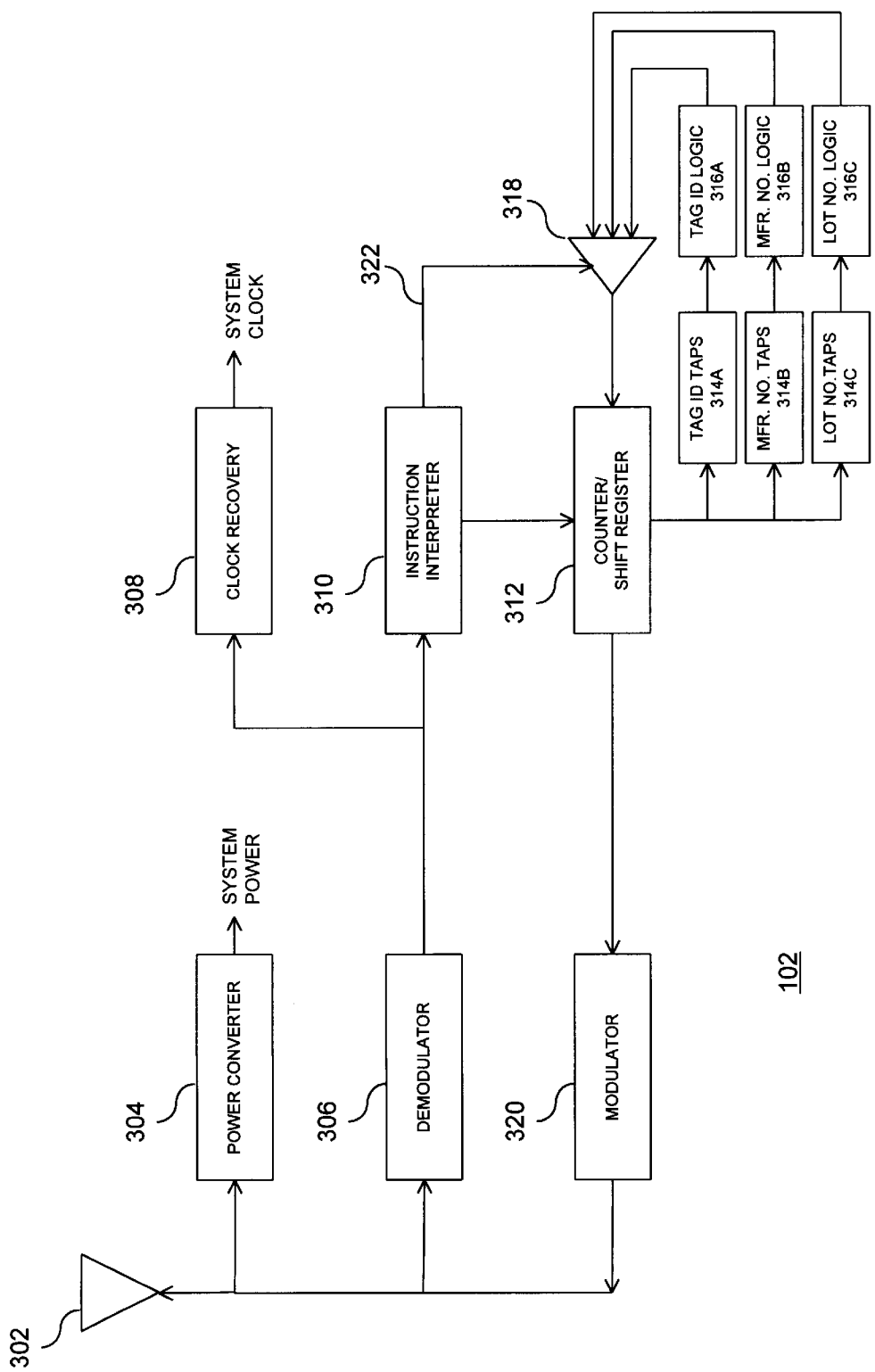
FIG. 3 is a circuit block diagram of an RFID tag according to a preferred embodiment of the present invention.

Now the architecture of the tag is described. FIG. 3 is a circuit block diagram of an RFID tag according to a preferred embodiment of the present invention. The particular circuit of FIG. 3 is presented by way of example only. Other circuits can be employed without departing from the spirit and scope of the present invention, as would be apparent to one skilled in the relevant art. Tag 102 includes at least one antenna 302, a power converter 304, a demodulator 306, a clock recovery circuit 308, an instruction interpreter 310, a counter/shift register 312, a plurality of laser-programmable taps 314a–314c, a plurality of tap decoder logic circuits 316a–316c, a multiplexer 318, and a modulator 320. In a preferred embodiment antenna 302 is an omnidirectional antenna, with its impedance matched to the frequency of transmission.

In the depicted embodiment, system power for each tag is provided by a charging signal transmitted by the reader prior to the tag reading operation. Power converter circuit 304 is used to convert the received charging signal to system power. Such power converter circuits are well known in the art. In a preferred embodiment, the charging signal need only be present for a short time to fully charge the tags. In an alternative embodiment, power converter 304 is replaced by a battery. In that embodiment, the tag reader 104 is not required to transmit a charging signal.

Demodulator 306 receives signals from tag reader 104 via antenna 302. In a preferred embodiment, the received signals comprise a charging signal and one or more instructions. These instructions are described in detail below. One such instruction includes a count instruction that instructs the tags to increment their counter/shift registers 312. In one embodiment, the count instruction causes counter/shift registers 312 to increment by one; in alternative embodiments, the instruction causes counter/shift registers 312 to increment by other values.

In a preferred embodiment, the instructions are transmitted by tag reader 104 using a phase-modulated RF signal using a several hundred kilohertz baud rate and a 900 megahertz carrier frequency. The instructions are sent by the reader with a "return to center" data format; this format is well-known in the art. The instructions are decoded by the tag to generate digital input for instruction interpreter 310 and a system clock. The system clock is recovered by clock recovery circuit 308.

Instruction interpreter 310 receives instructions from demodulator 306, and provides control signals and data to counter/shift register 312 and multiplexer 318. Laser programmable taps 314a–314c are permanently programmed with predetermined values at the time of tag manufacture. In a preferred embodiment, taps 314a–314c are programmed by laser-cutting specific output taps of a collection of inverters. As would be apparent to one skilled in the relevant arts, other technologies can be used to permanently program these values without departing from the scope of the present invention. In a preferred embodiment, taps 314a are programmed with the Tag ID, taps 314b are programmed with the tag manufacturer number and taps 314c are programmed with the tag lot number.

Decoder logic circuits 316a–316c are used to monitor the outputs of programmable taps 314a–314c. For example, when the value in counter/shift register 312 is the same as the value programmed into Tag ID taps 314a, Tag ID logic 316a decodes a Tag ID enable signal, which is provided to multiplexer 318.

Control line 322 is used by instruction interpreter 310 to indicate to multiplexer 318 which read cycle is being executed (that is, which permanently-programmed tag value is being tested). For example, during the second read cycle, the manufacturer number is being tested. When the counter/shift register 312 reaches the manufacturer number programmed into manufacturer taps 314b, manufacturer number logic 316b provides an enable signal to multiplexer 318. This enable signal is selected by control line 322 to cause shift register 312 to shift its contents (the Tag ID) to modulator 320 for transmission to tag reader 104.

As will be described below, the second read cycle is initiated by providing a second read instruction to instruction interpreter 310. In response to that instruction, instruction interpreter indicates to multiplexer 318 that the manufacturer number is being tested. In response, multiplexer 318 gates only the manufacturer number enable signal to counter/shift register 312. This enable signal causes counter/shift register 312 to shift the count, which is equivalent to the manufacturer number, to modulator 320 for transmission to the reader. In this way, the manufacturer number of a tag is transmitted to tag reader 104 when the count reaches the manufacturer number. Thus, the time at which the tag transmits during the second read cycle is controlled by the tag manufacturer number. As further described below, this mechanism is used to solve time slot contention problems.

Modulator 320 transmits the data provided by counter/shift register 312 to tag reader 104 via antenna 302 using amplitude-modulated (AM) RF back scatter signals. In a preferred embodiment a several hundred kilohertz baud rate is used with a 900 megahertz carrier frequency. Because the tag system clock is derived from the signal provided by the tag reader, the data sent by the tag to the reader is clock-synchronized with the reader.

In one embodiment, tag 102 also contains one or more sensors. Data collected by the sensors is routed to counter/shift register 312 each time tag 102 transmits. The sensor data is appended to the tag transmission and recorded by tag reader 104. In one embodiment, the sensor is a gas sensor that detects the presence of chemicals associated with drugs or precursor chemicals of explosives, such as methane. When a tag equipped with such a sensor is used as a baggage tag, it is a powerful mechanism for quickly locating bags containing contraband or explosives.

Figure 4:
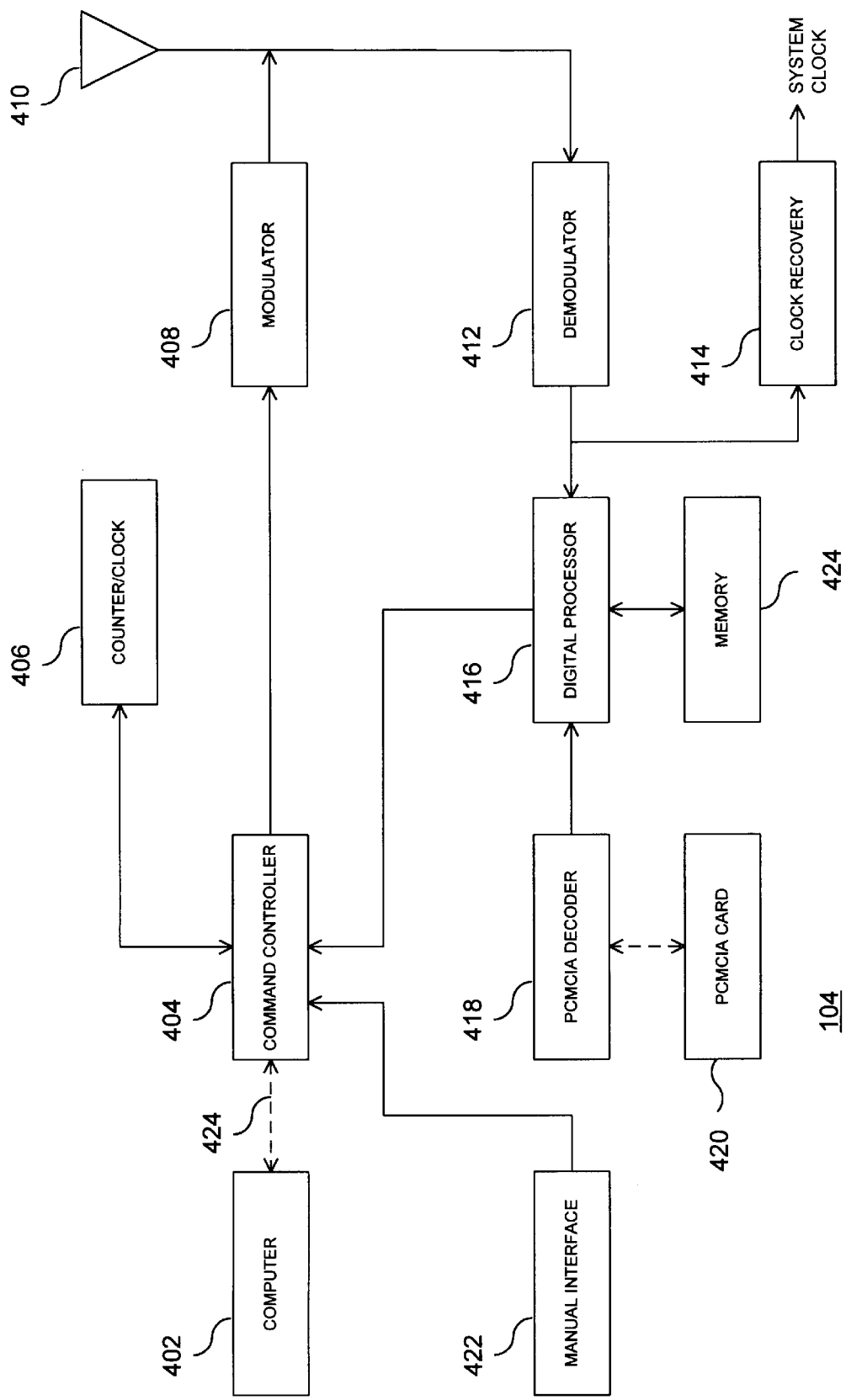
FIG. 4 is a circuit block diagram of the architecture of tag reader 104 according to a preferred embodiment.

The architecture of tag reader 104 is now described. FIG. 4 is a circuit block diagram of the architecture of tag reader 104 according to a preferred embodiment. The circuitry of tag reader is described in three categories: generic circuitry, processing circuitry, and application-specific circuitry.

Referring to FIG. 4, tag reader processing circuitry is represented by computer 402. Computer 402 performs high level processing functions not provided by tag reader generic circuitry. These high level functions include compiling inventory lists, handling time slot contentions, and the like, as would be apparent to one skilled in the relevant art. Computer 402 may be physically co-located with tag reader 104, as in the case of a stationary tag reader, or may be physically separate from tag reader 104, as may be the case with a hand-held or portable tag reader. The connection 424 between computer 402 and command controller 404 may be hard-wired or wireless.

Application-specific tag reader circuitry is represented by PCMCIA (Personal Computer Memory Card International Association) card 420. In a preferred embodiment, details regarding specific tags, applications, encryption scheme, sensor configuration and data, and modes of operation to be used can be embodied in PCMCIA card 420. In this embodiment, a generic tag reader 104 can be used for multiple inventory applications by merely using different PCMCIA cards.

The remaining circuitry in FIG. 4 comprises tag reader generic circuitry. This is the circuitry required by tag reader 104 to perform generic functions under the control of computer 402 and one or more PCMCIA cards 420. Generic tag reader circuitry includes command controller 404, counter/clock 406, modulator 408, one or more antennas 410, demodulator 412, clock recovery circuit 414, digital processor 416, memory 424, PCMCIA decoder 418, and manual interface 422.

In a preferred embodiment, tag contention is not addressed immediately after it occurs, but rather is resolved in a further read cycle. When a tag contention is detected, tag reader 104 stores the contended time slot number in memory 424. In a further read cycle, tag reader 104 retrieves each contended time slot number from memory 424 for resolution. To keep track of the time slots, tag reader 104 employs a clock/counter 406. Clock/counter 406 responds to the count instructions transmitted by tag reader 104 to tags 102. In this way, the contents of clock/counter 406 are the same as the contents of counter/shift register 312 in each tag 102. Thus, when tag reader 104 detects time slot contention, it can record the contended time slot number by storing the contents of clock/counter 406.

Command controller 404 generates data and instructions under the control of computer 402. These data and instructions are transmitted via modulator 408 and antenna 410 to tags 102. Tag transmissions are received via antenna 410 and demodulator 412 by digital processor 416, which communicates with computer 402 via command controller 404. In one embodiment, a system clock may be derived by clock recovery circuit 414 for use in analyzing tag transmissions. The PCMCIA card 420 is coupled to tag reader 104 via a PCMCIA decoder 418. A manual interface 422 provides the operator with control over the tag reader 104.

Modes of Operation—Timed Broadcast Read

Figure 5:
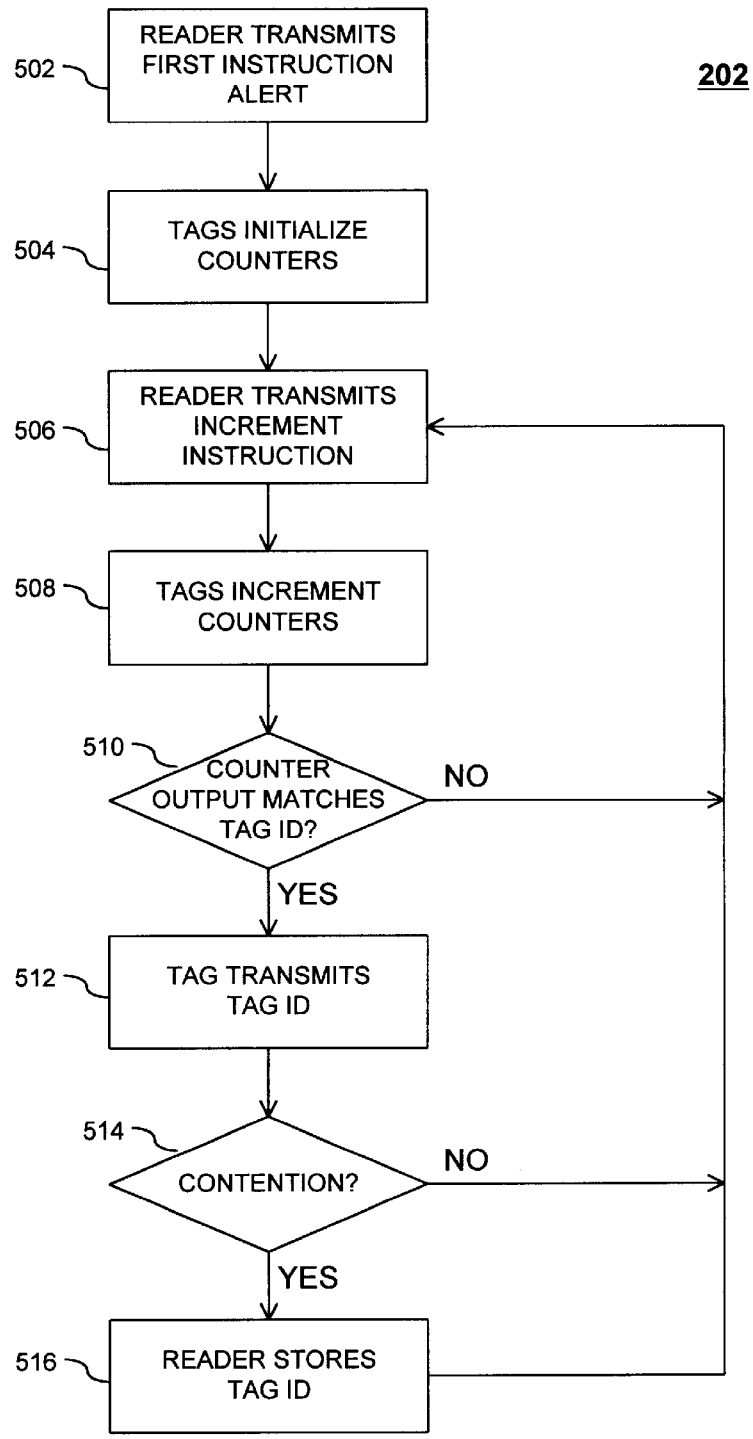
FIG. 5 is a flowchart depicting a first read operation of a timed broadcast read of the present invention.

As described above, the present invention provides at least three modes of operation: timed broadcast read, immediate read, and specific tag read. Timed broadcast read allows an ensemble of tags (from a few to several thousand) to be read within a time frame of a few seconds. FIG. 2 is a high-level flowchart of the timed broadcast read mode of operation of the present invention. FIG. 5 is a flowchart depicting the first read operation of the timed broadcast read of the present invention. During the first read operation, the tag reader steps the tags through a sequence of time slots. When a tag detects that a time slot matches its preprogrammed time slot, the tag transmits its Tag ID. If more than one tag transmits in the same time slot, the tag reader stores the time slot number for future resolution of the time slot contention.

First Read Cycle

Referring to FIG. 5, the timed broadcast read mode of operation begins when the tag reader transmits a first instruction alert to the tags, as shown in a step 502. The first instruction alert signals to the tags that this is the first instruction in the timed broadcast read mode of operation. In response, the tags initialize. In particular, the tags initialize their counters/shift registers 312, as shown in a step 504. The tag reader then repeatedly transmits a clock increment instruction, as shown in a step 506. In response to the increment instruction, each tag increments the count in its counter/shift register 312, as shown in Step 508. When a tags counter/shift register 312 output matches the Tag ID programmed into Tag ID taps 314a, as indicated by the "yes" branch from step 510, the tag transmits its Tag ID as shown in a step 512 and described above.

In an alternative embodiment, the tag does not transmit its Tag ID, but instead transmits a simple response signal, when a tags counter/shift register 312 output matches the Tag ID programmed into Tag ID taps 314a. The response signal need not convey any information describing the identity of the tag. Indeed, the response signal need not convey any information at all. The response signal need only indicate that a tag is present. In this embodiment, tag reader 104 keeps track of the count in the tag counter/shift register 312 by using an internal counter/clock 406. Counter/clock 406 is initialized in step 504, and is incremented in step 508 in response to the transmitted clock instruction. When tag reader 104 receives a response signal, tag reader 104 records the count in counter/clock 406. Because the tag transmitted the response signal when the count in its counter/shift register 312 equaled its Tag ID, and because the counter/clock 406 also contains that count, the presence of the particular tag that transmitted the response signal is recorded by recording the count in counter/clock 406. In a preferred embodiment, the response signal contains sufficient information for tag reader 104 to detect response signal contention when it occurs.

If more than one tag transmits in the same time slot, tag reader 104 detects time slot contention. If time slot contention is detected, as shown by the "yes" branch from step 514, tag reader 104 stores the Tag ID, as shown in a step 516. Tag reader 104 keeps track of the Tag ID using counter/clock 406. Tag reader 104 will use the Tag IDs to resolve the time slot contention for those Tag IDs in a second read cycle, which is described below and corresponds to step 206 in FIG. 2.

Second Read Cycle

Figure 6:
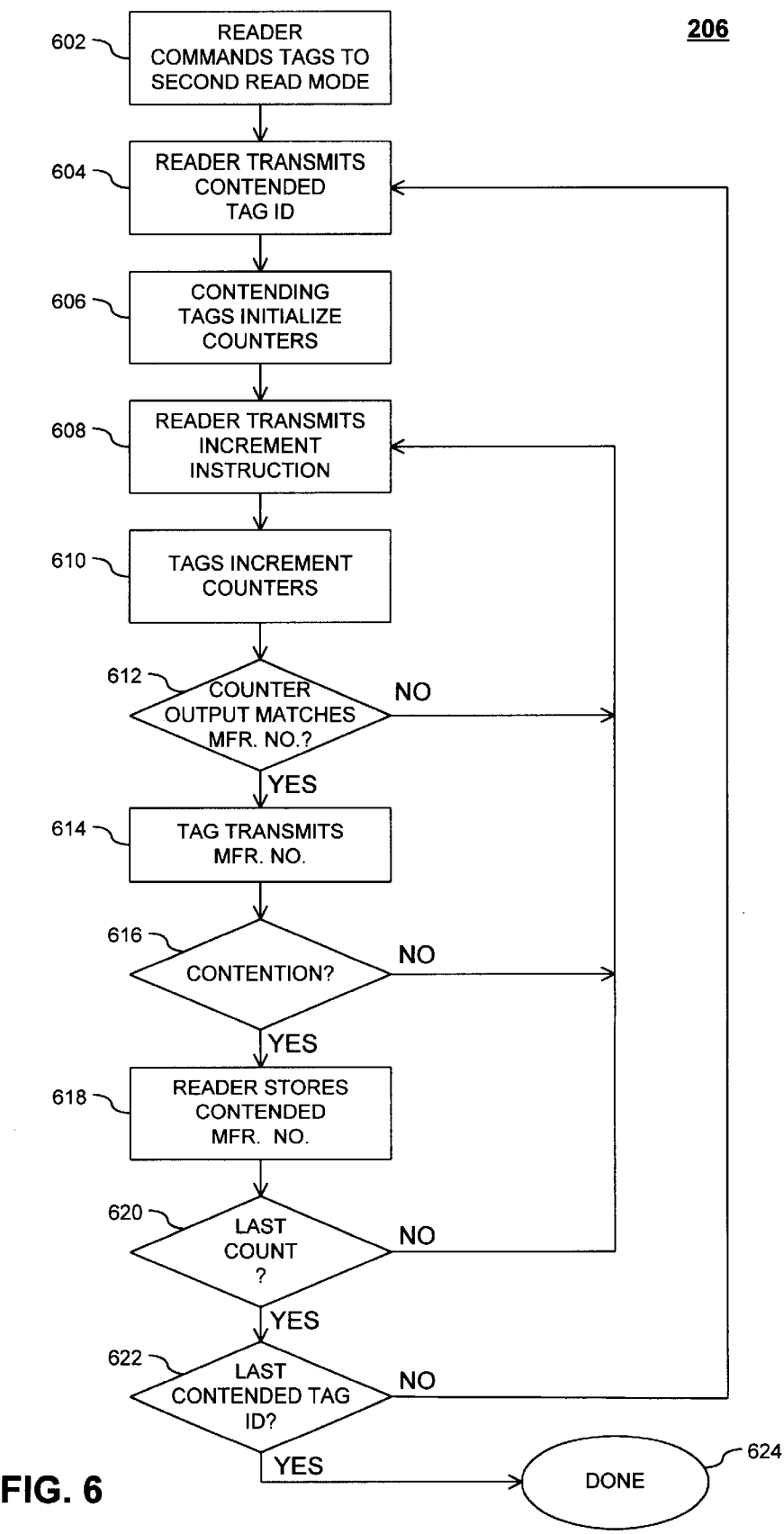
FIG. 6 is a flowchart depicting a second read operation of a timed broadcast read of the present invention.

In a preferred embodiment, the present invention employs a second read cycle to solve time slot contentions that occurred during the first read cycle. FIG. 6 is a flowchart depicting the operation of the present invention in the second read cycle according to a preferred embodiment. During the second read cycle, the system examines contentions for each Tag ID individually. For each contended Tag ID, tag reader 104 causes tags 102 to count in unison. When a tag's count matches its manufacturer number, the tag transmits that manufacturer number. In this way, the tag's manufacturer number controls the time slot during which the tag transmits. Because it is highly unlikely that more than one tag will have the same Tag ID and manufacturer number, it is unlikely that two tags will transmit in the same time slot during the second read. Therefore, Tag ID contention is resolved by the second read. In the unlikely event that multiple tags have the same Tag ID and manufacturer number, contention can be resolved using a third read cycle, as described below.

Referring to FIG. 6, tag reader 104 initiates the second read cycle by sending a second read mode instruction to tags 102, as shown in a step 602. The reader then transmits a contended Tag ID to the tags, as shown in a step 604. The step permits only those tags that contended for a particular Tag ID to participate in contention resolution for that Tag ID. In response to the transmission of the contended Tag ID, only those tags having that Tag ID initialize their counters/shift registers 312, as shown in a step 606.

Tag reader 104 then transmits the first in a series of increment instructions, as shown in a step 608. In response, the contending tags increment their counter/shift registers 312, as shown in a step 610. When the output of a tag's counter/shift register 312 matches the tag manufacturer number permanently programmed into manufacturer number taps 314b, as indicated by the "yes" branch from step 612, the tag transmits its manufacturer number, as shown in a step 614.

In an alternative embodiment, the tag transmits a simple response signal as described above. Tag reader 104 then records the tag's manufacturer number by storing the count in its counter/clock 406, as described above for the Tag ID.

If more than one tag transmits its manufacturer number simultaneously, tag reader 104 detects the contention, as indicated by the "yes" branch from step 616, and tag reader 104 stores the contended manufacturer number for future contention resolution in a third read cycle, as shown in a step 618.

Tag reader 104 steps tags 102 through a predetermined range of possible manufacturer numbers. When the last count is reached, as indicated by the "yes" branch from step 620, the process of steps 604 through 618 is repeated for the next contended Tag ID. When the last contended Tag ID has been examined, as indicated by the "yes" branch from step 622, the second read cycle is complete.

Third Read Cycle

Figure 7:
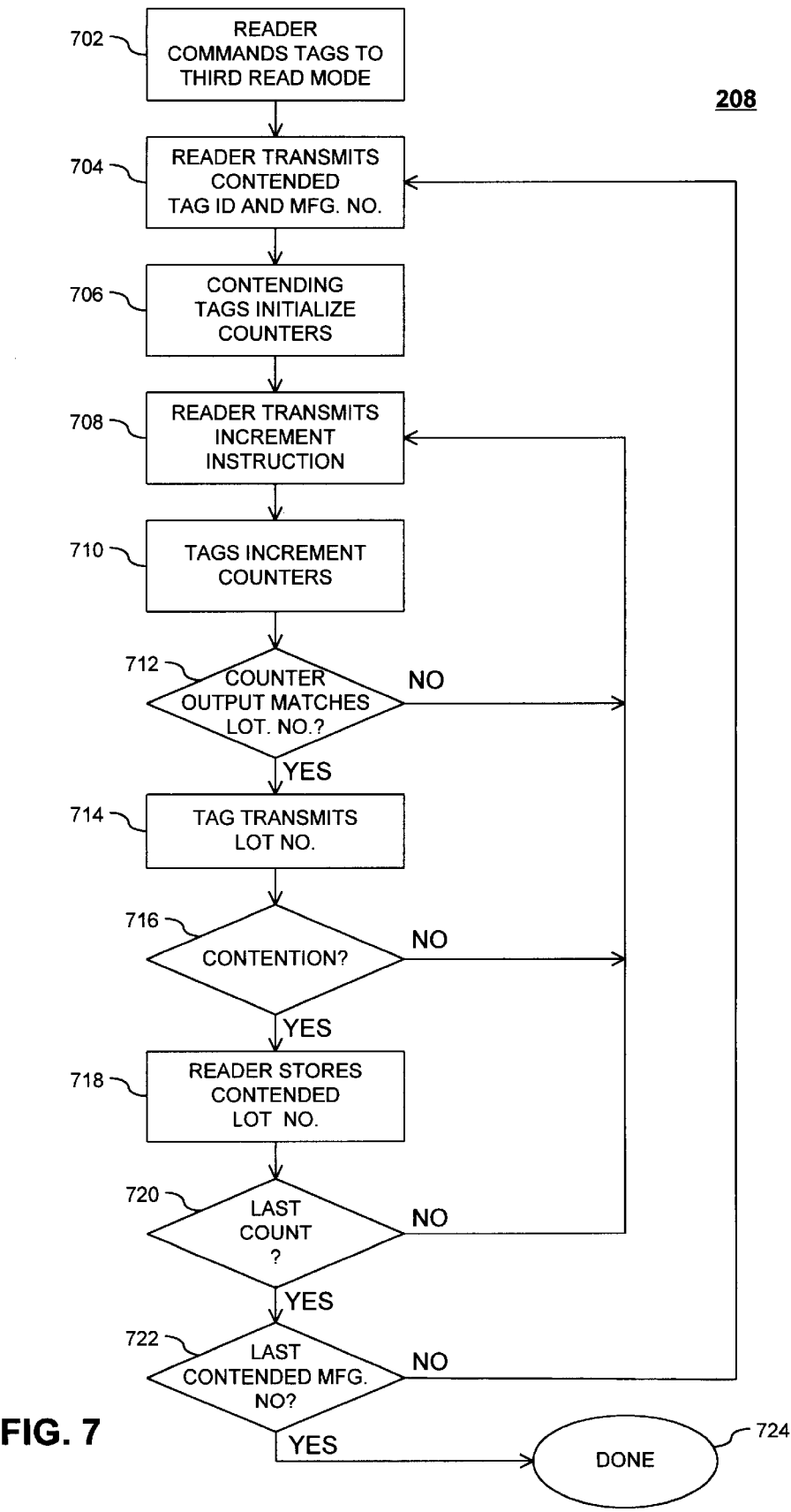
FIG. 7 is a flowchart depicting a third read operation of a timed broadcast read of the present invention.

In one embodiment, the present invention employs a third read cycle to resolve any time slot contentions that occurred during the second read cycle. FIG. 7 is a flowchart depicting the operation of the present invention in the third read cycle according to a preferred embodiment. During the third read cycle, the system examines contentions for each manufacturer number individually.

For each contended manufacturer number, tag reader 104 causes tags 102 to count in unison. When a tag's count matches its lot number, the tag transmits that lot number. In this way, the tag's lot number controls the time slot during which the tag transmits. Because it is highly unlikely that more than one tag will have the same Tag ID, manufacturer number, and lot number, it is extremely unlikely that two tags will transmit in the same time slot during the third read. Therefore, tag manufacturer number contention is resolved by the third read. In the unlikely event that multiple tags have the same Tag ID, manufacturer number, and lot number, contention can be resolved using a further read cycle based on other tag identification data, as would be apparent to one skilled in the relevant art using the above description.

Referring to FIG. 7, tag reader 104 initiates the third read cycle by sending a third read mode instruction to tags 102, as shown in a step 702. The reader then transmits a contended Tag ID and manufacturer number to the tags, as shown in a step 704. This step permits only those tags that contended for a particular Tag ID and manufacturer number to participate in contention resolution for that Tag ID and manufacturer number. In response to the transmission of the contended Tag ID and manufacturer number, only tags having that particular Tag ID and manufacturer number initialize their counters/shift registers 312, as shown in a step 706.

Tag reader 104 then transmits the first in a series of increment instructions, as shown in a step 708. In response, the contending tags increment their counter/shift registers 312, as shown in a step 710. When the output of a tag's counter/shift register 312 matches the tag lot number permanently programmed into lot number taps 314c, as indicated by the "yes" branch from step 712, the tag transmits its manufacturer number, as shown in a step 714.

In an alternative embodiment, the tag transmits a simple response signal as described above. Tag reader 104 then records the tag's lot number by storing the count in its counter/clock 406, as described above for the Tag ID.

If more than one tag transmits its lot number simultaneously, tag reader 104 detects the contention, as indicated by the "yes" branch from step 716, and tag reader 104 stores the contended manufacturer number for future contention resolution in a further read cycle, as shown in a step 718.

Tag reader 104 steps tags 102 through a predetermined range of possible lot numbers. When the last count is reached, as indicated by the "yes" branch from step 720, the process of steps 704 through 718 is repeated for the next contended manufacturer number. When the last contended manufacturer number has been examined, as indicated by the "yes" branch from step 722, the third read cycle is complete.

Immediate Read

Immediate read mode is used to read individual tags one at a time. In this mode, tag reader 104 transmits an instruction to a tag 102 that causes the tag to bypass the time slot counting operation and to immediately transmit its Tag ID number. This mode is useful for rapid Tag identification (on the order of milliseconds) when the individual tag rapidly passes through the reader zone. An example application is the reading of tags affixed to automobiles passing through an automatic toll booth.

Specific Tag Read

Specific tag read is used to determine whether one particular tag out is present in an ensemble of tags. Tag reader 104 accomplishes this by transmitting the particular Tag ID, manufacturer number, and lot number of the tag 102 that is sought. Because a compete set of Tag identification parameters is transmitted, only the tag being sought should respond. This approach is useful for retrieving a specific tagged item from an ensemble of items, for example for locating and removing a suspicious bag from an airplane cargo hold.

Tag Manufacture

Figure 8:
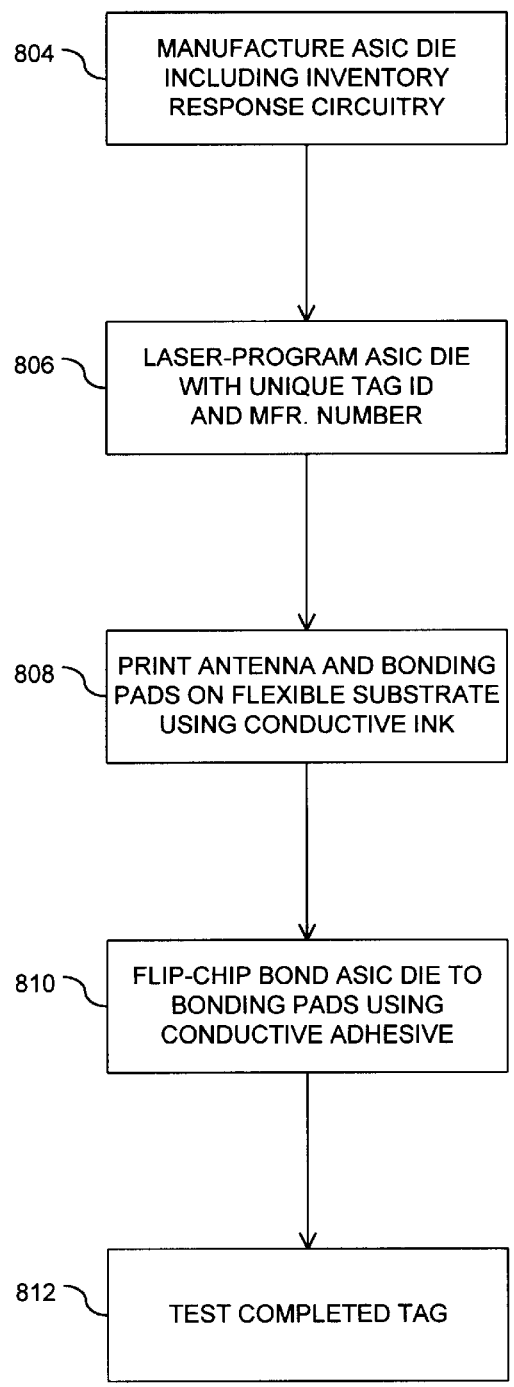
FIG. 8 is a flowchart depicting a method of manufacture for the RFID tag of the present invention.
Figure 9:
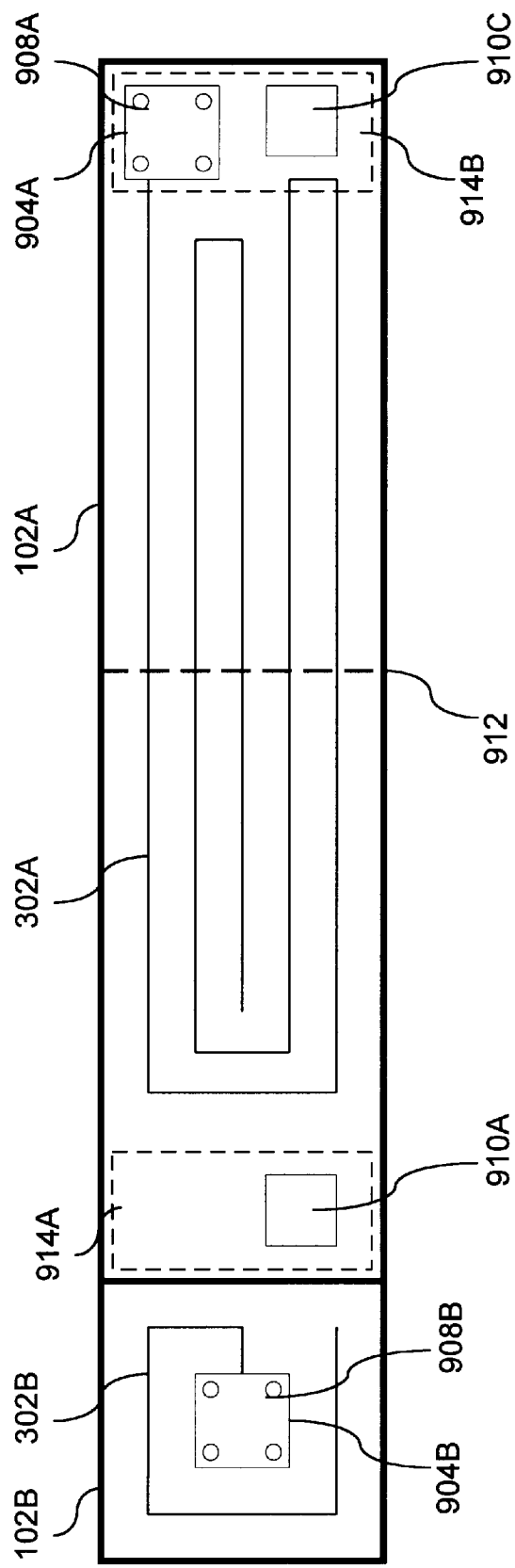
FIG. 9 depicts a pair of tags according to the present invention.

In order to be commercially viable, the RFID tags of the present invention must be inexpensive to manufacture. The present invention encompasses a unique method of manufacture to achieve this goal. FIG. 8 is a flowchart depicting a method of manufacture for the RFID tag 102 of the present invention. This method of manufacture is described with reference to the tag pair depicted in FIG. 9. FIG. 9 depicts a pair of tags 102a, 102b. Such a pair of tags is ideally suited for use in the airline baggage handling industry, as mentioned above and described in detail below. In practice, tags 102a and 102b are separated by the ticketing agent. Tag 102a is affixed to a passenger bag, while tag 102b is affixed to the passenger's ticket. In this way, the airline can ensure that both the passenger and his bag board the same airplane. Each tag 102 includes an antenna 302 and an application-specific integrated circuit (ASIC) 904 mounted on bonding pads.

In one embodiment, baggage tag 102a incorporates multiple tamper-resistant features. Tag 102a can be fixed to a bag by wrapping the tag about the bag's handle and joining tag portions 914a and 914b. In one embodiment, one area of 914 includes ASIC 904 so that attempting to separate areas 914a and 914b after joining destroys the ASIC and renders the tag inoperable. In another embodiment, baggage tag 102a includes one or more perforated tear lines 912. Perforated tear lines 912 tear easily, so that any tampering with tag 102a causes the tag to separate at a tear line 912. This tearing provides an immediate visual indication of tampering. Tear lines 912 can be placed across critical portions of the tag circuitry, such as antenna 302a, such that tag separation along tear line 912 renders the tag inoperative.

As described above, tag 102 is powered by a power source, such as a battery, in one embodiment. In this embodiment, the battery may be formed by placing an anode 910a in one joining area 914a of the tag and placing a cathode 910c in the other joining area of the tag 914b. At least one of anode 910a and cathode 910c is coated with a electrolytic material and covered by a release liner. In another embodiment, tag 102 is powered by a capacitor. In that embodiment, at least one of anode 910a and cathode 910c is coated with a dielectric material and covered by a release liner. Other power sources may be used with tag 102 without departing from the spirit and scope of the present invention, as would be apparent to one skilled in the relevant art.

The ticket agent joins the two joining areas 914a,b of tag 102 by removing the release liner and joining cathode 910c to anode 910a, thereby forming the power source of the tag. Any attempt to separate areas 914a,b after joining will destroy the power source formed by anode 910a and cathode 910c, thereby rendering the tag inoperative. In another embodiment, separating areas 914a,b after joining also gives a visual indication of tampering. For example, separating areas 914a,b could reveal a large "VOID" sign or some other image or break pattern.

Now the manufacture of tag 102 according to a preferred embodiment is described with reference to FIG. 8. In a step 804 one or more ASICs are manufactured. The ASICs include the inventory response circuitry depicted in FIG. 3. The circuitry includes the circuit elements of FIG. 3 except antenna 302. In one embodiment, all inventory response circuitry is contained upon a single ASIC. In another embodiment, RF circuitry is contained on one ASIC, and digital circuitry is contained on another ASIC. Then, in a step 806, the ASIC containing the digital inventory response circuitry is permanently programmed with at least the Tag ID and manufacturer number. In one embodiment the ASIC is also programmed with a lot number for the tag. In a preferred embodiment, these values are laser-programmed into taps 314a–314c, as described above.

Antenna 302 and bonding pads 908 are printed onto a flexible substrate using a conductive ink, as shown in a step 808. Such substrates are readily available from vendors such as 3M Corporation and Flexcon. Such conductive inks are widely available. Finally, the ASIC is flip-chip bonded to bonding pads 908 using a conductive adhesive, as shown in a step 810. One such conductive adhesive is a "z-axis" adhesive, which is well-known in the relevant art and is commercially available. The use of such an adhesive is advantageous in that adhesive conducts only in the z-axis. Therefore, even if the adhesive is applied so as to inadvertently join two bonding pads, the two pads do not short together. In one embodiment the ASIC is also hermetically sealed. In a preferred embodiment, ASIC 904 is manufactured using silicon-on-insulator technology.

As mentioned above, a key consideration in the manufacture of tags 102 is cost. A large component of the cost of manufacture of such items is the cost of testing the ASICs to ensure operability. In a preferred embodiment of the present invention, operability testing is deferred until tag manufacture is complete, as shown in a step 812. Also in the preferred embodiment, tags 102 are manufactured in bulk on a long continuous strip of substrate. The strips can be rolled for easy packaging, delivery, and dispensing. Before packaging, the strip is passed through a testing apparatus, where each tag in the strip is tested for operability. However, rather than attempting to discard inoperable tags, inoperable tags are merely marked as inoperable and are retained on the strip. Then, when a ticket agent encounters a tag marked inoperable in a roll of tags, the ticket agent merely discards the inoperative tag. This process saves considerable cost, and allows the tags of the present invention to be manufactured very inexpensively.

Airline Baggage Handling Example

Figure 10:
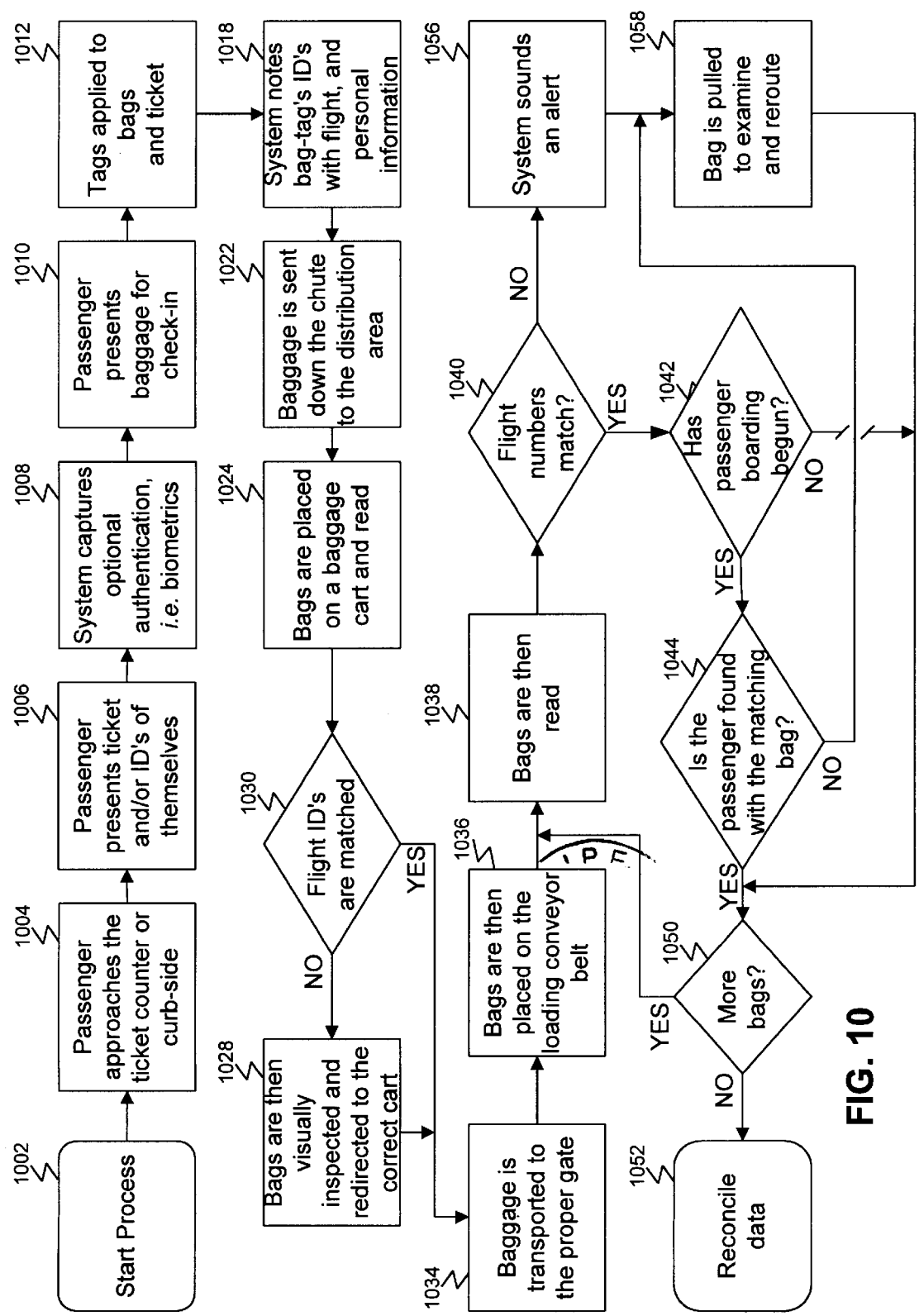
FIG. 10 is a flowchart depicting an example use of an embodiment of the present invention in the airline baggage handling industry.

As described above, the present invention is ideally suited to use in the airline baggage handling industry. An example of this use is presented in the flowchart of FIG. 10. The process begins when a passenger approaches the ticket counter or curbside check-in at the airport, as shown in Step 1004. The passenger then presents his ticket and/or a personal identification in a step 1006. The system captures this information; the system can also capture other authentication information such as biometrics, as show in a step 1008. When the passenger presents his baggage for check-in, as shown in step 1010, the ticket agent applies a tag to each bag and to the passenger's ticket. In a preferred embodiment, each of these tags bears an identical Tag ID, manufacturer number, and lot number. The system records the Tag ID, flight number, and passenger identity, as shown in a step 1018.

After the bag is sent down the chute to the distribution area, as shown in a step 1022, it is placed on a baggage cart in accordance with the flight number conventionally printed on the baggage tags, as shown in a step 1024. Once on the baggage cart, the bag tags are read to determine the Tag IDs. If the Tag IDs indicate that the bags are not on the proper baggage cart, as indicated by the "no" branch from step 1030, then the bags are visually inspected and redirected to the correct baggage cart, as shown in a step 1028.

The bags are then transported to the proper gate, loaded onto the designated airplane and then read again, as shown in steps 1034, 1036 and 1038. Once on the airplane in the cargo hold, the bags are read again, as shown in a step 1038. If the tag inventory determines that the bags are not on the proper plane, as indicated by the "no" branch from step 1040, then the system sounds an alert, as shown in a step 1056. Alternatively, the bags can be read on the conveyor belt before they are loaded into the cargo hold. After the alert is sounded, the bag can be removed and examined for re-routing as shown in a step 1058.

Once passenger boarding has begun, an inventory of passengers can be performed by scanning the tags on the passenger tickets. If a mismatch is detected between passengers and bags, as indicated by the "no" branch from step 1044, the identified bags can be pulled for examination and re-routing, as shown in step 1058. As more bags are loaded onto the airplane, the process is repeated, as indicated by the "yes" branch from step 1050. When all of the bags have been loaded as indicated by the "no" branch from step 1050, the system reconciles the collected data, as shown in step 1052.

The example use of the present invention described above provides at east two key benefits. First and foremost, the present invention provides a security benefit. In the example use described above, a would-be airline terrorist cannot place a bomb in his baggage and then have the baggage checked onto a plane unless the terrorist also boards the plane. Clearly, this is a significant deterrent to this form of terrorism.

Second, the present invention provides an efficiency benefit. The problem of lost or misrouted passenger baggage has become epidemic within the airline industry. The example use described above solves this problem. Because a passenger and his baggage must board the same airplane to satisfy the inventory system described above, lost baggage should become a thing of the past.

Electronic Article Surveillance Example

The present invention is also ideally suited to use in electronic article surveillance. In a retail clothing store, for example, a tag can be attached to each article of clothing on display. One or more tag readers can then be used to maintain an inventory of the clothing articles. For example, a tag reader can be placed on each rack or display of clothing. Periodic reads of the rack or display can disclose exactly when an item is removed.

Tag readers placed at the exits to the store can prevent shoplifting. In this example, each item bears a tag. Because the tags are extremely small, they can be placed within an article so as to prevent removal or even discovery. For example, a tag could be placed within a label, button or seam of a garment, the plastic center of a compact disk, or the case of a videocassette, to facilitate both overt and covert operation.

The store maintains an inventory database of all the articles within the store. Each entry in the database represents a garment and contains the Tag ID of the tag embedded in the article. The entry also indicates whether the item has been purchased. When a tag of an unpurchased article is detected by a door reader, an alarm is sounded, indicating that the article is being shoplifted.

When an item is purchased, its tag ID is removed from the inventory database. Therefore, when a tag attached to a purchased article moves past the door reader, no alarm is sounded. Used alone or with security cameras, the present invention provides an effective tool to combat shoplifting.

In another embodiment, the present invention could be used to implement an "unattended store," i.e. one with no salespersons or clerks. A customer could enter the store, select items and go to a purchasing area. In the purchasing area, a tag reader would identify the customer's selections. The customer would then be presented with a bill. The customer could pay the bill with a credit card, whereupon the unattended store would remove the purchased item from its inventory database. The customer could then leave the store with the purchases.

Example Instruction Set

Now an instruction set is described that can be used with the present invention. As would be apparent to one skilled in the relevant art, other instructions can be employed with the present invention without departing from its spirit and scope. In a preferred embodiment, the reader sends an instruction stream to the tag instruction register that is Nir bits long, where Nir is the number of stages in the instruction register. The instructions have the following data field format and symbolic binary values:

Np: Preamble: alerts the tags that the reader is starting communication. This data field is useful to prevent spurious noise from "spoofing" the tags and to initialize and synchronize the tag clock. The preamble starts with a long stream of "0" pulses from the reader, which starts the tag clock and initializes the tag instruction register. The 0's are followed by Np bits of a series of "1's", which alerts the tag that a reader instruction is following. Between instruction words, the reader sends out 0's for tag clock generation. When the preamble is present, the symbolic binary for this field is "1". A "0" represents the absence of the preamble.

Nw: Last instruction/in process/wake up: This data field is useful for dynamic read environments, where tags are moving into and out of the read zone, and prevents tags entering the read zone during a read cycle from erroneous communication. These tags will be "woken up" at the next read cycle to properly be identified. The "last instruction" sub-field notifies the tag to shut down. The symbolic binary form for this field is:

First Instruction Alert: 001

Subsequent instructions after wake up: 010

Last instruction; shut down: 100

Nt; Timed read cycle: Second read/first read: This field instructs the tag to go into the specified timed read cycle (first, second or third), with the following symbolic binary form:

No timed read: 000

First read: 001

Second read: 010

Third read: 100

Specific read: 111

Ni; Immediate read: When the symbolic binary form is "1", this field instructs the tag to immediately send out its ID number.

Nr; Specific tag read: When the symbolic binary form is "1", this field instructs the tag to go into the specific tag read mode as designated by Nt, above. The reader will cycle through three instructions to set the tag to the proper state. The first is with Nt=001 and sets the Tag ID counter for the targeted tag. The second is with Nt=010 and sets up the second counter with the targeted manufacturer number. The third is with Nt=100 and sets up the third counter with the targeted lot number. Then the reader sends out clock with Nt=111 to read only the targeted tag at every clock instruction.

Nm; Clock/Count: This field sets the counter shift registers (SR's) into either the clocked mode to increment the counter by the next clock signal, or into the SR mode, awaiting the following time slot, wafer/lot number, or date instruction stream. It has the symbolic binary form:

Clocked mode: 01

Specific count: 10

Ns; Clock signal/time slot. This data field contains either specific counter instruction data, or a stream of zeroes if the tag is being instructed into the count mode. The symbolic binary form is "1" when there is a specific counter instruction, and "0" for the count mode. When Nm=01 and Ns=0, a clock instruction counter, Nc, is enabled.

Nc: Clock instruction signal to increment counter/shift registers 312. The symbolic binary form is:

No clock instruction: 00

Clock: 01

Last clock: 11

The clock instruction counter, Nc, allows the reader to "short cycle" the tag through the count sequence, bypassing the Nir instruction sequence, which can be as long as 32, 48, or 64 bits. Nc, on the other hand, could theoretically be as short as 2 bits, although 4 bits is implemented here. Once the clock instruction is sent out, the reader waits for a tag response. If none comes within a specified time frame, it sends out another clock instruction. When a tag responds with its ID number, the reader waits until the ID number transmission is completed before sending out the next clock instruction. If only a few tens to a few hundreds of tags are in the ensemble, this "short cycle" clocking can accelerate tag read time by as much as a factor of 10. On completing the clock read cycle, the full instruction register will be re-enabled for the next sequence of instructions from the reader, such as for any required contention resolution, or for tag shut down.

The n-bit instruction stream is organized as follows: Nir=Nc/Ns/Nm/Nr/Ni/Nt/Nw/Np, with each field comprised of sub-fields in the format described above. This provides the generalized symbolic binary form of Nir=xx/x/xx/x/x/xxx/xxx/x where the x's represent either 1's or 0's. An example instruction stream is shown below for each operational mode of the tag. The 1's represent a resulting action or state directed by an instruction sub-field while 0's represent the off state of an instruction sub-field.

Timed Broadcast Read: Nc/Ns/Nm/Nr/Ni/Nt/Nw/Np
Initialization: 00/0/00/0/0/000/000/0
First instruction of first read cycle: 00/0/01/0/0/001/001/1
Following instructions of first read cycle: 01/0/01/0/0/001/010/1
Last clock instruction: 11/0/01/0/0/001/010/1
First instruction for second cycle: 00/1/10/1/0/010/010/1
Following instructions for second cycle: 01/0/01/0/0/010/010/1
Last clock instruction for second cycle: 11/0/01/0/0/010/010/1
First instruction for third cycle: 00/1/10/1/0/100/010/1
Following instructions for third cycle: 01/0/01/0/0/100/010/1
Last clock instruction: 11/0/01/0/0/100/010/1
Last instruction (tags turn off): 00/0/00/0/0/000/100/1

Immediate Read: Nc/Ns/Nm/Nr/Ni/Nt/Nw/Np
Initialization: 00/0/00/0/0/000/000/0
First instruction: 00/0/00/0/1/000/001/1
Next and last instruction (tag turns off): 00/0/00/0/0/000/100/1

Specific Tag Read: Nc/Ns/Nm/Nr/Ni/Nt/Nw/Np
Initialization: 00/0/00/0/0/000/000/0
First instruction: 00/1/10/1/0/001/001/1
Second instruction: 00/1/10 1/0/010/010/1
Third instruction: 00/1/10/1/0/100/010/1
Following clock instructions: 01/0/01/1/0/111/010/1
Last clock instruction: 11/0/01/0/0/111/010/1
First instruction of next specific read: 00/1/10/1/0/001/010/1
Second instruction of next read: 00/1/10/1/0/010/010/1
Third instruction of next read: 00/1/10/1/0/100/010/1
Following clock instructions: 01/0/01/1/0/111/010/1
Last clock instruction: 11/0/01/0/0/111/010/1
Last instruction (tag turns off): 00/0/00/0/0/000/100/1

Conclusion

While various embodiments of the present invention have been described above, it should be understood that they have been presented by way of example, and not limitation. It will be apparent to persons skilled in the relevant art that various changes in form and detail can be made therein without departing from the spirit and scope of the invention. Thus the present invention should not be limited by any of the above-described exemplary embodiments, but should be defined only in accordance with the following claims and their equivalents.

What is claimed is:

1. A method for conducting an inventory of passenger bags, wherein a bag tag is attached to each bag and each bag tag is permanently assigned a tag identification number (Tag ID) and a manufacturer number, the method comprising the steps of:

at a tag reader, transmitting a wake-up signal followed by at least one first clock signal;

at each bag tag,
- incrementing a first tag count in response to said at least one first clock signal, and
- transmitting the Tag ID assigned to said each bag tag when said Tag ID of said each bag tag corresponds to said first tag count;

at said tag reader,
- incrementing a first reader count in response to said at least one first clock signal,
- storing a given first reader count when more than one bag tag responds to one of said at least one clock first signal that corresponds to said given first reader count, and
- transmitting said given first reader count followed by at least one second clock signal; and at each bag tag that responded to said one of said at least one first clock signal that corresponds to said given first reader count,
- incrementing a second tag count in response to said at least one second clock signal, and
- transmitting the manufacturer number assigned to said each bag tag that responded to said one of said at least one first clock signal that corresponds to said given first reader count when said manufacturer number of said each bag tag corresponds to said second count.

2. The method of claim 1, wherein a ticket tag is attached to each passenger's ticket and each ticket tag is permanently assigned the Tag ID and the manufacturer number of the bag tag attached to the passenger's bag, further comprising the steps of:

- conducting an inventory of the ticket tags according to the method of claim 1; and
- comparing said inventory of ticket tags to the inventory of bag tags to ensure that each passenger and said each passenger's bags board the same vehicle.

3. The method of claim 1, wherein:
each bag tag is permanently assigned a tag ID and a manufacturer number at the time of manufacture.

4. The method of claim 1, wherein at least one bag tag includes a sensor, further comprising the step of:
at the at least one bag tag, transmitting the contents of said sensor.

5. A tag for use in conducting an inventory of passenger bags, wherein each bag is attached to a tag and each tag is permanently assigned a tag identification number (Tag ID) and a manufacturer number, the tag comprising:

- means for receiving a wake-up signal followed by at least one first clock signal;
- means for incrementing a first tag count in response to said at least one first clock signal;
- means for transmitting the Tag ID assigned to the tag when said Tag ID corresponds to said first tag count;
- means for receiving at least one second clock signal;
- means for incrementing a second tag count in response to said at least one second clock signal; and
- means for transmitting the manufacturer number assigned to the tag when said manufacturer number of said each tag corresponds to said second count.

6. The tag of claim 5, further comprising:
- a sensor; and
- means for transmitting the contents of said sensor.

7. A reader for conducting an inventory of passenger bags, wherein each bag is attached to a tag and each tag is permanently assigned a tag identification number (Tag ID) and a manufacturer number, the reader comprising:

- means for transmitting a wake-up signal followed by at least one clock signal;
- means for incrementing a first reader count in response to said at least one first clock signal,
- means for receiving a Tag ID transmitted by a tag in response to one of said at least one first clock signal;
- means for storing a given first reader count when more than one tag responds to one of said at least one first clock signal that corresponds to said given first reader count;
- means for transmitting said given first reader count followed by at least one second clock signal; and
- means for receiving a manufacturer number transmitted by a tag in response to one of said at least one second clock signal.

8. A system for locating a tag, wherein each tag is assigned a permanent identification number and a permanent manufacturer number, the system comprising:

- a tag reader configured to transmit a wake-up signal, a first time slot number corresponding to the permanent identification number of a tag to be located and a second time slot number corresponding to the permanent manufacturer number of a tag to be located; and
- at least one tag that transmits, in response to receiving said first time slot number, said permanent identification number assigned to said at least one tag when said permanent identification number assigned to said at least one tag corresponds to said time slot number, wherein said at least one tag further transmits, in response to receiving said second time slot number, the permanent manufacturer number assigned to said at least one tag when the permanent manufacturer number assigned to said at least one tag corresponds to said second time slot number.

9. The system of claim 8, wherein each said tag is further assigned a permanent lot number, wherein said tag reader is further configured to transmit a third time slot number corresponding to the permanent lot number of a tag to be located, wherein said at least one tag transmits, in response to receiving said third time slot number, the permanent lot number assigned to said at least one tag corresponding to said third time slot number.

10. A method for locating a tag, wherein each tag is assigned a permanent identification number and a permanent manufacture number, the method comprising the steps of:

- at a tag reader, transmitting a wake-up signal followed by a first time slot number corresponding to the permanent identification number of a tag to be located;
- at each tag, transmitting a permanent identification number assigned to said each tag when said permanent identification number assigned to said each tag corresponds to said time slot number;
- at each said tag reader, transmitting a second time slot number corresponding to the permanent manufacturer number of a tag to be located; and at each said tag whose permanent identification number matches said first time slot number, and in response to receiving said second time slot number, transmitting the permanent manufacturer number assigned to said tag when the permanent manufacturer number assigned to said tag corresponds to said second time slot number.

11. The method of claim 10, wherein each said tag is further assigned a permanent lot number, wherein the method further comprises the step of:

at said tag reader, transmitting a third time slot number corresponding to the permanent lot number of a tag to be located; and at each said tag whose permanent manufacturer number matches said second time slot number, and in response to receiving said third time slot number, transmitting the permanent lot number assigned to said tag when the permanent lot number assigned to said tag corresponds to said third time slot number.

12. A system for conducting an inventory of tags, wherein each tag is assigned a first permanent identification number and a second permanent identification number, the system comprising:

a tag reader having means for transmitting a wake-up signal followed by at least one clock signal and for incrementing a reader count in response to said at least one clock signal, means for storing a given reader count when more than one tag responds to one of said at least one clock signal that corresponds to said given reader count, and means for transmitting said given reader count followed by at least one second clock signal; and at least one tag, wherein each tag has, means for incrementing a first tag count in response to said at least one clock signal, means for transmitting the first permanent identification number assigned to said each tag when said permanent identification number of said each tag corresponds to said first tag count.

means for incrementing a second tag count in response to said at least one second clock signal, and means for transmitting the second permanent identification number assigned to each said tag when the second permanent identification number of each said tag corresponds to said second tag count.

13. The system of claim 12, wherein said tag reader further includes means for transmitting an instruction to perform a tag read.

14. The system of claim 12, wherein the duration of tag transmissions is fixed, wherein said tag reader further includes means for transmitting a further one of said at least one clock signal after the tag transmission duration has elapsed.

15. The system of claim 12, wherein said tag reader further includes means for transmitting a further one of said at least one clock signal after a tag response time has elapsed, wherein said tag response time is the maximum duration of time between a tag reader transmission and the reception at said tag reader of a corresponding tag transmission.

16. The system of claim 12, wherein said at least one tag includes a sensor; and means for transmitting the contents of said sensor.

17. The system of claim 12, wherein each tag is permanently assigned said first permanent identification number and said second permanent identification number at the time of manufacture.

18. The system of claim 12, wherein said permanent identification number is encrypted.

19. The system of claim 12, further comprising: means for transmitting a charging signal, thereby energizing the tags.

20. The system of claim 12, wherein said tag reader includes means for indicating an error when said reader count does not correspond to said first permanent identification.

21. The system of claim 12, wherein corresponding ones of said first permanent identification number and said reader count are identical.

22. The system of claim 12, wherein said tag reader includes means for transmitting an instruction to perform a second tag read.

23. The system of claim 12, further comprising:

at said tag reader, means for incrementing a second reader count in response to said at least one second clock signal.

24. The system of claim 23, wherein said tag reader includes means for indicating an error when said second reader count does not correspond to said second permanent identification number.

25. The system of claim 23, wherein said tag reader includes means for storing said given reader count and a given second reader count when more than one tag responds to one of said at least one second clock signal that corresponds to said given second reader count.

26. The system of claim 25, wherein each tag is assigned a third permanent identification number, wherein said tag reader further includes means for transmitting said given reader count and said given second reader count followed by at least one third clock signal;

wherein each said tag further includes, means for incrementing a third tag count in response to said at least one third clock signal, and means for transmitting the third permanent identification number assigned to said each tag when said third permanent identification number of said each tag corresponds to said third tag count.

27. The system of claim 26, wherein said tag reader further includes means for transmitting an instruction to perform a third tag read.

28. The system of claim 26, wherein said tag reader further includes means for incrementing a third reader count in response to said at least one third clock signal.

29. The system of claim 28, wherein said tag reader further includes means for indicating an error when said third reader count does not correspond to said third permanent identification number.

30. A method for conducting an inventory of tags, wherein each tag is assigned a first permanent identification number and a second permanent identification number, the method comprising the steps of:

at a tag reader, transmitting a wake-up signal followed by at least one clock signal, incrementing a reader count in response to said at least one clock signal, storing a given reader count when more than one tag responds to one of said at least one clock signal that corresponds to said given reader count, and transmitting said given reader count followed by at least one second clock signal; and at each tag, incrementing a tag count in response to said at least one clock signal, and transmitting the permanent identification number assigned to said each tag when said permanent identification number of said each tag corresponds to said tag count;

at each tag that responded to said at least one clock signal, incrementing a second tag count in response to said at least one second clock signal, and transmitting the second permanent identification number assigned to said each tag when said second permanent identification number of said each tag corresponds to said second count.

31. The method of claim 30, further comprising the step of: at said tag reader, transmitting an instruction to perform a tag read.

32. The method of claim 30, wherein the duration of tag transmissions is fixed, further comprising the step of:

at said tag reader, transmitting a further one of said at least one clock signal after the tag transmission duration has elapsed.

33. The method of claim 30, further comprising the step of:

at said tag reader, transmitting a further one of said at least one clock signal after a tag response time has elapsed, wherein said tag response time is the maximum duration of time between a tag reader transmission and the reception at said tag reader of a corresponding tag transmission.

34. The method of claim 30, wherein:

each bag tag is permanently assigned a tag ID and a manufacturer number at the time of manufacture.

35. The method of claim 30, wherein at least one bag tag includes a sensor, further comprising the step of:

at the at least one bag tag, transmitting the contents of said sensor.

36. The method of claim 30, wherein said permanent identification number is encrypted.

37. The method of claim 30, further comprising the step of:

transmitting a charging signal, thereby energizing the tags.

38. The method of claim 30, further comprising the step of:

at said tag reader, indicating an error when said reader count does not correspond to said permanent identification number.

39. The method of claim 30, wherein:

corresponding ones of said permanent identification number and said reader count are identical.

40. The method of claim 30, further comprising the step of:

at said tag reader, transmitting an instruction to perform a second tag read.

41. The method of claim 30, further comprising the step of:

at said tag reader, incrementing a second reader count in response to said at least one second clock signal.

42. The method of claim 41, further comprising the step of:

at said tag reader, indicating an error when said second reader count does not correspond to said second permanent identification number.

43. The method of claim 41, further comprising the step of:

at said tag reader, storing said given reader count and a given second reader count when more than one tag responds to one of said at least one second clock signals that corresponds to said given second reader count.

44. The method of claim 43, wherein each tag is assigned a third permanent identification number, further comprising the steps of:

at said tag reader, transmitting said given reader count and said given second reader count followed by at least one third clock signal;

at each tag that responded to said one of said at least one second clock signal that corresponds to said given second reader count, incrementing a third tag count in response to said at least one third clock signal, and transmitting the third permanent identification number assigned to said each tag when said third permanent identification number of said each tag corresponds to said third tag count.

45. The method of claim 44, further comprising the step of:

at said tag reader, transmitting an instruction to perform a third tag read.

46. The method of claim 44, further comprising the step of:

at said tag reader, incrementing a third reader count in response to said at least one third clock signal.

47. The method of claim 46, further comprising the step of:

at said tag reader, indicating an error when said third reader count does not correspond to said third permanent identification number.

48. A system for conducting an inventory of tags, wherein each tag is assigned a first and a second permanent identification number, the system comprising:

a tag reader having, means for transmitting a wake-up signal followed by at least one clock signal, means for incrementing a reader count in response to said at least one clock signal, means for storing a given reader count when more than one tag responds to one of said at least one clock signal that corresponds to said given reader count, means for recording said reader count when one of said response signals is received, thereby recording the presence of the tag that transmitted said one of said response signals, means for transmitting said given reader count followed by at least one second clock signal, means for incrementing a second reader count in response to said at least one second clock signal, and means for recording said second reader count when one of said second response signals is received, thereby recording the presence of the tag that transmitted said one of said second response signals;

at least two tags, wherein each tag has, means for incrementing a tag count in response to said at least one clock signal, means for transmitting a response signal when said permanent identification number of said each tag corresponds to said tag count, means for incrementing a second tag count in response to said at least one second clock signal, and means for transmitting a second response signal when said second permanent identification number of said each tag corresponds to said second count.

49. The system of claim 48, wherein said tag reader includes means for transmitting an instruction to perform a tag read.

50. The system of claim 48, wherein the duration of tag transmissions is fixed, wherein said tag reader further includes means for transmitting a further one of said at least one clock signal after the tag transmission duration has elapsed.

51. The system of claim 48, wherein said tag reader further includes means for transmitting a further one of said at least one clock signal after a tag response time has elapsed, wherein said tag response time is the maximum duration of time between a tag reader transmission and the reception at said tag reader of a corresponding tag transmission.

52. The system of claim 48, wherein each of said at least two tags include a sensor; and means for transmitting the contents of said sensor.

53. The system of claim 48, further comprising:
means for transmitting a charging signal, thereby energizing the tags.

54. The system of claim 48, wherein said tag reader further includes means for transmitting an instruction to perform a second tag read.

55. The system of claim 48, wherein said tag reader further includes means for storing said given reader count and a given second reader count when more than one tag responds to one of said at least one second clock signal that corresponds to said given second reader count.

56. The system of claim 55, wherein each tag is assigned a third permanent identification number, wherein said tag reader further includes,
means for transmitting said given reader count and said given second reader count followed by at least one third clock signal, and
means for incrementing a third reader count in response to said at least one third clock signal;
wherein each tag further includes,
means for incrementing a third tag count in response to said at least one third clock signal, and
means for transmitting a third response signal when said third permanent identification number of said each tag corresponds to said third tag count; and
wherein said tag reader further includes means for recording said third reader count when one of said third response signals is received, thereby recording the presence of the tag that transmitted said one of said third response signals.

57. The system of claim 56, wherein said tag reader further includes means for transmitting an instruction to perform a third tag read.

58. A method for conducting an inventory of tags, wherein each tag is assigned a permanent identification number and a second permanent identification number, the method comprising the steps of:
at a tag reader,
transmitting a wake-up signal followed by at least one clock signal, and
incrementing a reader count in response to said at least one clock signal;
at each tag,
incrementing a tag count in response to said at least one clock signal, and
transmitting a response signal when said permanent identification number of said each tag corresponds to said tag count;
at said tag reader,
recording said reader count when one of said response signals is received, thereby recording the presence of the tag that transmitted said one of said response signals,
storing a given reader count when more than one tag responds to one of said at least one clock signal that corresponds to said given reader count,
transmitting said given reader count followed by at least one second clock signal, and incrementing a second reader count in response to said at least one second clock signal;
at each tag that responded to said one of said at least one clock signal that corresponds to said given reader count,
incrementing a second tag count in response to said at least one second clock signal, and transmitting a second response signal when said second permanent identification number of said each tag corresponds to said second count; and
at said tag reader,
recording said second reader count when one of said second response signals is received, thereby recording the presence of the tag that transmitted said one of said second response signals.

59. The method of claim 58, further comprising the step of:
at said tag reader, transmitting an instruction to perform a tag read.

60. The method of claim 58, wherein the duration of tag transmissions is fixed, further comprising the step of:
at said tag reader, transmitting a further one of said at least one clock signal after the tag transmission duration has elapsed.

61. The method of claim 58, further comprising the step of:
at said tag reader, transmitting a further one of said at least one clock signal after a tag response time has elapsed, wherein said tag response time is the maximum duration of time between a tag reader transmission and the reception at said tag reader of a corresponding tag transmission.

62. The method of claim 58, further comprising the steps of:
at each tag,
sensing an external condition; and
transmitting information regarding said external condition.

63. The method of claim 58, further comprising the step of:
transmitting a charging signal, thereby energizing the tags.

64. The method of claim 58, further comprising the step of:
at said tag reader, transmitting an instruction to perform a second tag read.

65. The method of claim 58, further comprising the step of:
at said tag reader, storing said given reader count and a given second reader count when more than one tag responds to one of said at least one second clock signal that corresponds to said given second reader count.

66. The method of claim 65, wherein each tag is assigned a third permanent identification number, further comprising the steps of:
at said tag reader,
transmitting said given reader count and said given second reader count followed by at least one third clock signal, and
incrementing a third reader count in response to said at least one third clock signal;

at each tag that responded to said one of said at least one second clock signal that corresponds to said given second reader count,
incrementing a third tag count in response to said at least one third clock signal, and
transmitting a third response signal when said third permanent identification number of said each tag corresponds to said third tag count; and at said tag reader, recording said third reader count when one of said third response signals is received, thereby recording the presence of the tag that transmitted said one of said third response signals.

67. The method of claim 66, further comprising the step of:

at said tag reader, transmitting an instruction to perform a third tag read.

* * * * *

UNITED STATES PATENT AND TRADEMARK OFFICE
CERTIFICATE OF CORRECTION

PATENT NO. : 6,002,344

DATED : December 14, 1999

INVENTORS : Bandy *et al.*

It is certified that errors appear in the above-identified patent and that said Letters Patent is hereby corrected as shown below.

On the title page, in item [56], please add the following cited references:

-U.S. Patent No. 5,515,053, dated May of 1996, to Hecht *et al.*

-U.S. Patent No. 5,539,775, dated July of 1996, to Tuttle *et al.*

-EP 0 496 986 A2, dated August of 1992

-EP 0 578 457 A2, dated January of 1994

In column 15, line 8, replace "when said" with --when the--.

In column 15, line 14, replace "clock first" with --first clock--.

In column 15, line 28, replace "when said" with --when the--.

In column 15, line 60, replace "when said" with --when the--.

In column 15, line 66, replace "when said" with --when the--.

In column 16, line 36, replace "said permanent" with --the permanent--.

In column 16, line 65, delete "each".

In column 17, line 27, delete "one of".

In column 18, line 56, delete "one of".

UNITED STATES PATENT AND TRADEMARK OFFICE
CERTIFICATE OF CORRECTION

Page 2 of 3

PATENT NO. : 6,002,344

DATED : December 14, 1999

INVENTORS : Bandy et al.

It is certified that errors appear in the above-identified patent and that said Letters Patent is hereby corrected as shown below.

In column 20, line 35, delete "one of".

In column 20, lines 38-39, replace "one of said" with --a--.

In column 20, line 39, replace "signals is received, thereby" with --signal is received from a tag, thereby--.

In column 20, line 40, replace "the tag" with --said tag--.

In column 20, lines 40-41, delete "said one of".

In column 20, line 41, replace "signals" with --signal--.

In column 20, line 48, replace "one of said" with --a--.

In column 20, lines 48-49, replace "signals is received, thereby" with --signal is received from a tag, thereby--.

In column 20, line 49, replace "the tag" with --said tag--.

In column 20, line 50, delete "said one of".

In column 20, line 51, replace "signals," with --signal,--.

In column 20, line 56, delete "each".

In column 20, line 63, delete "each".

In column 21, line 24, delete "one of".

UNITED STATES PATENT AND TRADEMARK OFFICE
CERTIFICATE OF CORRECTION

PATENT NO. : 6,002,344

DATED : December 14, 1999

INVENTORS : Bandy et al.

It is certified that errors appear in the above-identified patent and that said Letters Patent is hereby corrected as shown below.

In column 22, line 15, replace "count" with --tag count--.

In column 22, line 19, delete "said".

In column 22, line 20, replace "signals" with --signal--.

Signed and Sealed this

Thirteenth Day of February, 2001

Attest:

NICHOLAS P. GODICI

Attesting Officer    Acting Director of the United States Patent and Trademark Office